(12) United States Patent
Liu

(10) Patent No.: US 11,436,282 B2
(45) Date of Patent: Sep. 6, 2022

(54) METHODS, DEVICES AND MEDIA FOR PROVIDING SEARCH SUGGESTIONS

(71) Applicant: BAIDU ONLINE NETWORK TECHNOLOGY (BEIJING) CO., LTD., Beijing (CN)

(72) Inventor: Junqi Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 170 days.

(21) Appl. No.: 16/780,521

(22) Filed: Feb. 3, 2020

(65) Prior Publication Data

US 2020/0265094 A1 Aug. 20, 2020

(30) Foreign Application Priority Data

Feb. 20, 2019 (CN) .......................... 201910127197.8

(51) Int. Cl.
*G06F 16/00* (2019.01)
*G06F 16/9032* (2019.01)
*G06F 40/30* (2020.01)
*G06F 16/9038* (2019.01)
*G06F 16/10* (2019.01)

(52) U.S. Cl.
CPC .... *G06F 16/90328* (2019.01); *G06F 16/9038* (2019.01); *G06F 16/90332* (2019.01); *G06F 40/30* (2020.01)

(58) Field of Classification Search
None
See application file for complete search history.

(56) References Cited

U.S. PATENT DOCUMENTS 8,250,071 B1 * 8/2012 Killalea ................. G06F 40/30
707/728
8,612,414 B2 * 12/2013 Lee ..................... G06F 16/9535
707/706

(Continued)

FOREIGN PATENT DOCUMENTS

CN 104933081 A 9/2015
CN 105589954 A 5/2016

(Continued)

OTHER PUBLICATIONS

Office Action for Chinese Application No. 201910127197.8, dated Aug. 26, 2020, 16 pages.

(Continued)

*Primary Examiner* — Polina G Peach
(74) *Attorney, Agent, or Firm* — Fay Sharpe LLP

(57) ABSTRACT

A method for providing search suggestions, a device, and a computer-readable storage medium, are provided according to the present disclosure. The method for providing search suggestions includes: obtaining an input search term in a search box of a search interface and determining a first group of suggested search terms associated with the input search term. The method further includes: displaying the first group of suggested search terms in the search interface, and in response to a selection for one or more first suggested search terms from the first group of suggested search terms, searching by taking the input search term and the one or more first suggested search terms as search keywords.

14 Claims, 6 Drawing Sheets

(56) References Cited

U.S. PATENT DOCUMENTS

| | | | |
|---|---|---|---|
| 9,690,858 B1* | 6/2017 | Diliberto | G06F 16/3322 |
| 10,042,896 B2* | 8/2018 | Sun | G06F 16/24578 |
| 2007/0294225 A1* | 12/2007 | Radlinski | G06F 16/9535 |
| 2009/0276419 A1* | 11/2009 | Jones | G06F 16/3322 |
| 2011/0264682 A1* | 10/2011 | Song | H04N 21/252 |
| | | | 707/769 |
| 2012/0265779 A1* | 10/2012 | Hsu | G06F 16/3322 |
| | | | 707/E17.074 |
| 2012/0303651 A1* | 11/2012 | Tao | G06F 16/24578 |
| | | | 707/768 |
| 2013/0226953 A1* | 8/2013 | Markovich | G06F 16/90324 |
| | | | 707/767 |
| 2015/0100562 A1* | 4/2015 | Kohlmeier | G06F 16/332 |
| | | | 707/706 |
| 2015/0213042 A1* | 7/2015 | Cao | G06F 16/90324 |
| | | | 707/706 |
| 2015/0370434 A1 | 12/2015 | Kritt et al. | |
| 2016/0162588 A1* | 6/2016 | Tuchman | G06F 16/9535 |
| | | | 707/722 |
| 2017/0242913 A1* | 8/2017 | Tijssen | G06F 40/279 |
| 2017/0357733 A1* | 12/2017 | Lobo | G06F 3/0488 |
| 2018/0032523 A1* | 2/2018 | Singhal | G06F 16/3322 |
| 2018/0089212 A1* | 3/2018 | Deutsch Peled | G06F 16/90324 |
| 2018/0285457 A1 | 10/2018 | Pulbere et al. | |
| 2019/0095482 A1* | 3/2019 | Ignatyev | G06F 16/2455 |
| 2019/0251125 A1* | 8/2019 | Song | G06F 16/90328 |
| 2019/0311275 A1* | 10/2019 | Huang | G06F 16/9535 |
| 2019/0340255 A1* | 11/2019 | Huyghe | G06F 16/313 |
| 2020/0201849 A1* | 6/2020 | Tanaka | G06F 3/0482 |
| 2021/0118556 A1* | 4/2021 | Caffarel | G06F 16/2455 |

FOREIGN PATENT DOCUMENTS

| | | |
|---|---|---|
| CN | 107257972 A | 10/2017 |
| CN | 108804532 A | 11/2018 |
| JP | 2004287827 A | 10/2004 |
| JP | 2009129373 A | 6/2009 |
| JP | 2010049372 A | 3/2010 |
| JP | 2012501499 A | 1/2012 |
| JP | 2015095180 A | 5/2015 |

OTHER PUBLICATIONS

Office Action for Japanese Application No. 2020-024072, dated Dec. 21, 2020, 8 pages.
Office Action for Japanese Application No. 2020-024072, dated Aug. 24, 2021, 3 pages.

* cited by examiner

METHODS, DEVICES AND MEDIA FOR PROVIDING SEARCH SUGGESTIONS

CROSS-REFERENCE TO RELATED APPLICATION

This application claims a priority to and benefits of Chinese Patent Application No. 201910127197.8, filed with the China National Intellectual Property Administration on Feb. 20, 2019, the entire content of which is incorporated herein by reference.

FIELD

Embodiments of the present disclosure mainly relate to the search field, and more particularly to a method, a device, and a computer-readable storage medium for providing search suggestions.

BACKGROUND

Search is a way to quickly obtain information of interest. An electronic device, such as a laptop, a mobile phone, and a tablet, may run an application for searching. A user may input a search term in an interface of such application, and request a search server or a search engine to search based on a search keyword. The search server or the search engine may feedback search results associated with the search term. In general, accuracy of the search results and user satisfaction relate to the search keyword. To enable the search more accurate and comprehensive, some search suggestions may be provided to the user, and the user may further restrict execution of the search by selecting from such search suggestions.

SUMMARY

According to exemplary embodiments of the present disclosure, a solution for providing search suggestions is provided.

In a first aspect of embodiments of the present disclosure, there is provided a method for providing search suggestions. The method includes obtaining an input search term in a search box of a search interface; determining a first group of suggested search terms associated with the input search term; displaying the first group of suggested search terms in the search interface; and in response to a selection for one or more first suggested search terms from the first group of suggested search terms, searching by taking the input search term and the one or more first suggested search terms as search keywords.

In a second aspect of embodiments of the present disclosure, there is provided an electronic device. The electronic device includes one or more processors and a storage device. The storage device is configured to store one or more programs. When the one or more programs are executed by the one or more processors, the one or more processors are configured to implement the method according to the first aspect of embodiments of the present disclosure.

In a third aspect of embodiments of the present disclosure, there is provided a computer-readable storage medium having computer programs stored thereon. When the computer programs are executed by a processor, the method according to the first aspect of embodiments of the present disclosure is implemented.

It should be understood that, descriptions in Summary of the present disclosure are not intended to limit essential or important features in embodiments of the present disclosure, and are also not construed to limit the scope of the present disclosure. Other features of the present disclosure will be easily understood by following descriptions.

BRIEF DESCRIPTION OF THE DRAWINGS

The above and other features, advantages and aspects of respective embodiments of the present disclosure will become more apparent with reference to accompanying drawings and following detailed illustrations. In the accompanying drawings, the same or similar numeral references represent the same or similar elements, in which.

DETAILED DESCRIPTION

Embodiments of the present disclosure will be described in more detail below with reference to the accompanying drawings. While certain embodiments of the present disclosure have been illustrated in the accompanying drawings, it is to be understood that the present disclosure may be embodied in various forms and should not be construed as being limited to the embodiments set forth herein. Instead, these embodiments are provided for a thorough and complete understanding of the present disclosure. It should be understood that the drawings and embodiments of the present disclosure are for illustrative purposes only and are not intended to limit the scope of the present disclosure.

In the description of embodiments of the present disclosure, terms such as "include" and its equivalents should be understood as an inclusive meaning, i.e. "include but not limited to". Terms such as "based on" should be understood as "at least partially based on". Terms such as "an embodiment" or "the embodiment" should be understood as "at least one embodiment". Terms such as "first", "second" and the like may represent different or same objects. Other explicit and implicit definitions may also be included below.

Figure 1:
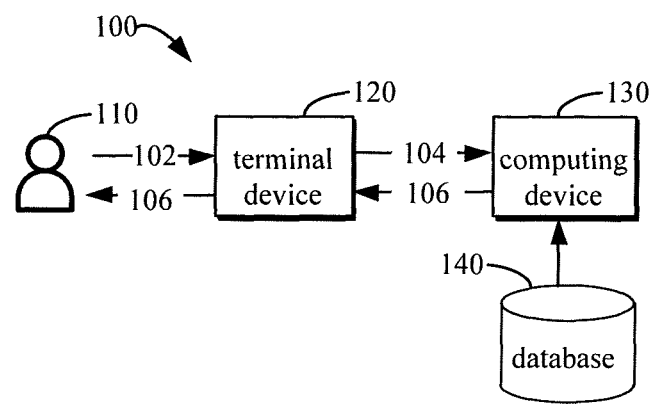
FIG. 1 is a schematic diagram illustrating an exemplary scene where embodiments of the present disclosure may be implemented.

FIG. 1 is a schematic diagram illustrating an exemplary scene 100 where embodiments of the present disclosure may be implemented. In the scene 100, a user 110 may input a search term 102 through a terminal device 120. The terminal device 120 may be any device having a wired or wireless communication function, including but not limited to, a mobile phone, a computer, a personal digital assistant, a game machine, a wearable device, a virtual-reality device or an augmented-reality device. The terminal device 120 may be installed with an application or software having a search function. Therefore, the user 110 may input the search term 102 in a user interface of the application or the software. The search term 102 may be inputted by a tool such as a keyboard/stylus pen, by a speech, or by selection, insertion or the like through an input device.

The terminal device 120 has a wired and/or wireless connection with the computing device 130, for example, having a connection via the Internet. After detecting that the user 110 initiates a search request, the terminal device 120 sends the search request 104 to the computing device 130 for requesting a searching. The search request 104 includes the search term 102. The computing device 130 is configured to perform a search function in response to the search request. Therefore, the computing device 130 may also be called as a search device, a search server or the like. The computing device 130 may be any electronic device having a computing, processing and/or analysis ability, including but not limited to any physical computer, virtual machine, or large-scale computing device provided by various service providers.

The computing device 130 may retrieve a database 140 during searching, to determine content related to the search term 102. The database 140 may store pre-supplied and/or dynamically-crawled content, such as one or more types of content for example webpage documents, text documents, images, and videos. Although a single database is illustrated, in some embodiments, the computing device 130 may access a plurality of separate databases 140. After content related to the search term 102 is determined, the computing device 130 takes the determined content as search results 106 to feedback to the terminal device 120. The terminal device 120 may present the search results 106 to the user 110. For example, the search results 106 may be displayed through a display of the terminal device 120.

Although only one computing device is illustrated in FIG. 1, it should be understood that this is for exemplary purposes merely and is not intended to limit the scope of the present disclosure. In some embodiments, the function of the computing device 130 may be implemented on a plurality of computing devices. In some embodiments, the exemplary scene 100 may also include different numbers of computing devices and/or computing devices with different functions.

The above describes various components included in the exemplary scene 100 and functions of the components for exemplary purposes only. It should be understood that, embodiments of the present disclosure may also be implemented in other environments having different components and/or respective functions. In the following, some embodiments of the present disclosure will be described in detail with reference to the exemplary scene 100 illustrated in FIG. 1.

For reflecting a search requirement of the user more accurately during searching, search suggestions may be provided based on the search term inputted by the user. The search requirement may be identified more quickly and accurately by selecting from the search suggestions. There are generally a plurality of factors influencing expression of the search requirement of the user. One factor is that accuracy of the search term inputted by the user is low. For example, the search term inputted by the user being incorrect (for example, a tongue is not accurately distinguished when Pinyin is typed, or a wrongly-written character appears), search terms in different languages being hard to accurately match, identification of different types of search terms (for example, whether the input corresponds to a character string having specific directivity such as an website).

Another factor relates to analysis and understanding on content inputted by the user. In addition, displaying and interaction for the search suggestions may also affect the expression of the requirement of the user. For example, a plurality of types of data for the search term inputted by the user may be related. Since an area for displaying the search suggestions in the terminal device is limited, particularly for the mobile terminal, ordering for a large number of search suggestions may decide a possibility of clicking of the user. An interactive behavior of the user during searching relates to the terminal device. For mobile devices such as smart phones, there is less limited interaction space and fewer interaction means. Therefore, higher-quality search suggestions are advantageous to effective and accurate interactions.

In the current search application, the search suggestions may be provided based on search histories. In detail, the search histories may be matched to the search term inputted by the user, and the matched search histories may be displayed for the user as the search suggestions of the current search for selecting. The search histories may be synchronized among a plurality of terminal devices. Another way for providing the search suggestions is to directly analyze the search term inputted by the user, and return a group of ordered search suggestions to the user in combination with big data, hot data, geographic information, relevance, etc. Such search suggestions may be websites or keywords. The user may select a search suggestion as the search keyword.

However, the above ways for providing the search suggestions may cause that information with higher popularity is more likely to be recommended or ordered forward in case of the same search term. For example, when a name is inputted, and the name corresponds to two characters (that is, the two characters have the same name), information related to a character having higher popularity is taken as the search suggestion to display for the user, or a character that is ordered forward during displaying is displayed for the user. In this way, a boundary of the expression for the user requirement is not distinguished clearly, and a relationship between the search suggestion and the search result is not definite. In addition, for a search term with broad meanings that is inputted by the user, the current ways for providing the search suggestions may not quickly capture or locate direction of interest for the user.

According to embodiments of the present disclosure, there is provided an improved solution for providing search suggestions. In the solution, one or more suggested search terms associated with an input search term, are determined and displayed. When the displayed suggested search term is selected, the input search term and the selected suggested search term are taken as search keywords for searching. In this way, directions of interest on search may be refined more quickly and accurately, thereby providing more accurate search results as expected.

Figure 2:
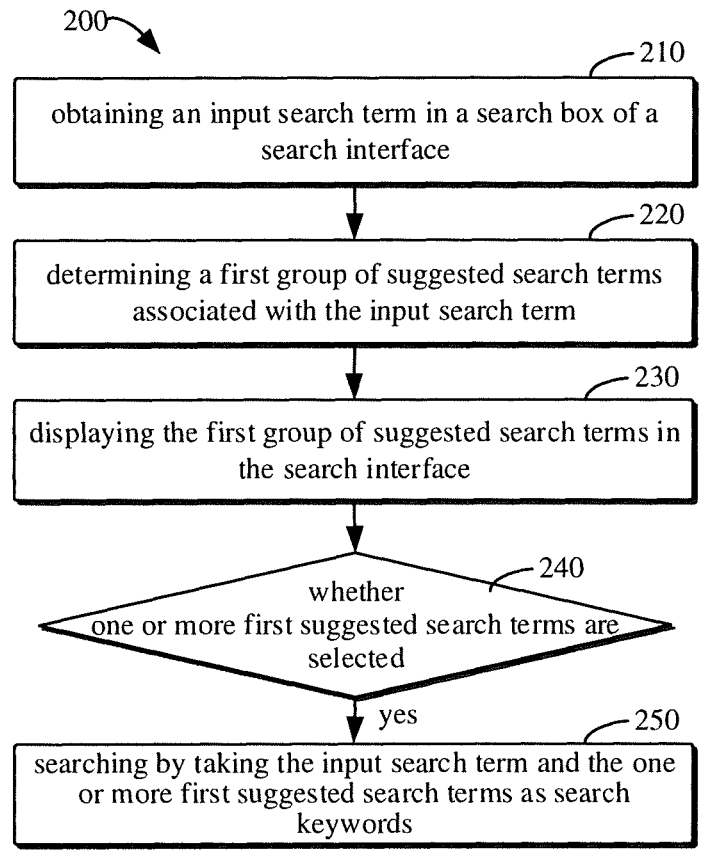
FIG. 2 is a flow chart illustrating a procedure for providing search suggestions according to some embodiments of the present disclosure.

Embodiments of the present disclosure may be described in detail below with reference to the accompanying drawings. FIG. 2 is a flow chart illustrating a procedure 200 for providing search suggestions according to some embodiments of the present disclosure. The procedure 200 may be implemented by the computing device 130 illustrated in FIG. 1. For discussing conveniently, the procedure 200 may be described with reference to FIG. 1. It should be understood that, although the procedure 200 is illustrated in a particular order, some actions in procedure 200 may be performed in different orders or in a parallel manner. The procedure 200 may also include actions not illustrated and/or omitted, which is not limited by embodiments of the present disclosure herein.

At block 210, the computing device 130 obtains an input search term in a search box of a search interface. The input search term is a search condition actively inputted by a user such as the user 110 illustrated in FIG. 1. The search interface may be displayed for the user 110 by the terminal device 120 that the user may access. The search interface usually includes one search box for inputting and editing search terms. The terminal device 120 may notify the input search term to the computing device 130.

Figure 3A:
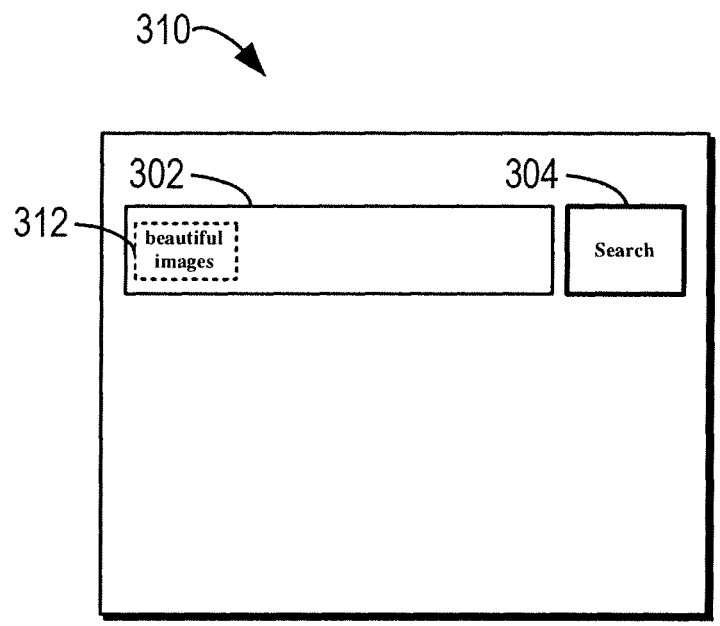
FIGS. 3A-3E are schematic diagrams illustrating user interfaces for providing search suggestions according to some embodiments of the present disclosure.

FIG. 3A illustrates an example of a search interface 310. The search interface 310 may be displayed by the mobile device 120. It should be understood that, search interfaces illustrated in FIGS. 3A-3E are only provided for the purpose of explanation. In different implementations, the search interface for receiving the search term may be arranged in various manners. As illustrated in FIG. 3A, the search interface 310 includes a search box 302 and a search button 304. The search box 302 may be configured to receive and to display the input search term. A search request may be initiated to the computing device 130 by clicking or selecting the search button 304. In an example of FIG. 3A, a search term 312 is inputted into the search box 302, such as a search term "beautiful images". The terminal device 120 may provide the search term 312 detected in the search box 302 to the computing device 130.

Referring to FIG. 2, at block 220, the computing device 130 determines a first group of suggested search terms associated with the input search term. The suggested search term refers to a search term which is recommended for the user automatically as a search condition. Each suggested search term may include one or more characters, words, phrases and the like. The suggested search terms may relate to text with specific types, such as websites represented by character strings, specific codes represented by digit strings, web addresses, etc. In some embodiments, each suggested search term is configured to describe one or more types related to the input search term. The suggested search term may be a description for a refined classification of a preset input search term, and may be considered as classification information or attribution information of the preset input search term. The suggested search term may also be called as a marker, a classification marker, a keyword marker or the like. In some embodiments, the first group of suggested search terms may include a plurality of suggested search terms having classification comparability.

In some embodiments, the suggested search terms associated with the input search term may be determined from a search thesaurus including a plurality of preset suggested search terms. The preset suggested search terms may predetermined based on performing data analysis on data in a database for searching. In some embodiments, the search thesaurus may also store or record correlations between the preset input search term and one or more suggested search terms, facilitating to obtain the suggested search terms.

Determination for the preset suggested search terms may be executed by the computing device 130 or other devices. How to generate the preset suggested search terms will be described below. For describing conveniently, it takes that the computing device 130 determines the preset suggested search terms as an example for illustration. However, it should be understood that, the determination for the preset suggested search terms may also be executed by other individual device.

In detail, the computing device 130 may obtain data from one or more data sources, for example, obtain data from respective Internet websites and established databases (e.g., a database 140). The obtained data may be such as webpage data or structured data. One or more types of data such as text, images, audios, videos may be used for analysis.

After the data is obtained, the computing device 130 may analyze the obtained data, to determine content related to the obtained data, particularly key information in the obtained data. The computing device 130 may perform subsequent processing based on an analyzed result after analyzing the obtained data. In some embodiments, when the different data obtained (such as, first data and second data) includes the same search term (called as the preset input search term), the computing device 130 may determine the suggested search terms associated with the preset input search term based on a correlation between the first data and the second data. The preset input search term herein refers to predicting an input search term which may be provided by the user from the obtained data. The first data and the second data may be two different documents (such as webpages, text documents, images, videos, and/or audios) from the same data source or different data sources. The preset input search term may be extracted from the first data and the second data, for example an entity (such as a character, an object, an event, etc.) described in the first data and the second data. The preset input search term may also be determined by counting historical input words.

In some embodiments, when there is a higher correlation (for example, the correlation is higher than a threshold correlation) between the first data and the second data, for example, both the first data and the second data relate to a detailed description for the preset input search term, the computing device 130 may determine the suggested search terms by utilizing attribution description information for the preset input search term, which is mentioned in both the first data and the second data.

In some cases, the same preset input search term may refer to different entities, that is, names of entities overlap. In order to better distinguish different entities referred by the same name, suggested search terms with higher identification may also be determined based on a correlation. Although the names of the entities are the same, different entities may have different data for describing, and there is lower correlation among these data. In some embodiments, the computing device 130 may determine that a correlation between the first data and the second data that include the preset input search term is lower (for example, the correlation is lower than the threshold correlation). In this case, the computing device 130 may determine the suggested search terms associated with the preset input search term from the first data or the second data. A selection for the suggested search term enables that a correlation between the suggested search term and the first data has a greater difference with a correlation between the suggested search term and the second data. For example, the suggested search term may be included in the first data for describing the input search term, but be not be mentioned in the second data, or vice versa.

Such determination for the suggested search terms is advantage for distinguishing refinement of the search results when the names of the entities are the same. For example, it is assumed that there are two characters having the same name, data related to one character describes an attribution of the character (such as, a job), and data related to the other character does not mention the attribution. Then a name of the job may be taken as the suggested search term, to facilitate to narrow down a search scope more quickly and accurately when the user inputs a person's name for searching.

In some embodiments, the preset input search term may have bidirectional association with the suggested search term. In other words, there may be one or more suggested search terms associated with the same search term, and the same search term may be taken as a suggested search term of one or more preset input search terms. Different data with higher correlation may be determined, and the preset input search terms and the suggested search terms associated with each other may be established based on these data.

In some embodiments, in order to ensure validity of the preset suggested search term, the computing device 130 may also measure reliability of one or more data sources. For example, a website ran by a person or organization with higher authenticity or reliability, or a website with heavy accessing traffic may have higher reliability, and may provide true and reliable data. On the contrary, a website with self-maintained content, a website with low traffic, or a website with high spam content may be less authentic, and have lower reliability. Data obtained from a data source with higher reliability may influence generation of the suggested search terms, to facilitate to output the suggested search terms with higher efficiency.

In some embodiments, the computing device 130 may also determine the suggested search terms based on types of the data provided by one or more data sources, to ensure the efficiency of the preset suggested search terms. The same data source may provide different types of data. For example, the same website may have different data channels (such as a technology channel, a military channel, a constellation channel, etc.). Data provided by these data channels may be classified into different types. In another example, different data sources such as data provided by different websites may be classified into different types. There are corresponding correlations among different types of data. For example, there may be a certain correlation between technology information provided by the technology channel and military information provided by the military channel in a website, but there may be no correlation between the technology information and information in the constellation channel. A classification corresponding to the data source may be determined in advance. The classification of data may reflect the type of the preset input search term and/or the suggested search term determined from the data. In some embodiments, data having the same or related type with the preset input search term may be used to generate the suggested search term with a higher probability.

The computing device 130 may employ different data analysis technologies for different types of data when executing the data analysis. For example, the computing device 130 may employ various text analysis technologies for text content, such as natural language processing (NLP) technology, text feature extraction and classification technology, etc., to achieve feature extraction, content classification, synonym merging, etc., thereby reducing redundancy, and obtaining one or more key features as key information.

In addition to the text analysis, other data analysis technology may be utilized. For example, the computing device 130 may analyze information corresponding to an image by utilizing the image recognition technology, for example, performing object recognition on the image, to recognize targets and objects in different modes. On the other hand, the computing device 130 may also perform analysis on audio and/or video data by utilizing the speech recognition technology. The speech recognition technology may also be called as automatic speech recognition (ASR), which aims to transform vocabulary content in a human speech into computer-readable input, such as keystrokes, binary codes, or character sequences. Data obtained after the image analysis or the speech recognition may be used as the basis for subsequent processing, or may be transformed into text information for further extraction of key information (particularly for a speech recognition result).

The above discusses that the suggested search terms may be determined in advance. In some embodiments for dynamically determining, the computing device 130 may analyze data in one or more data sources such as the databases or the websites timely and dynamically, to generate the suggested search terms associated with the input search term. In some embodiments, since the data in the data source such as the database or the website may be updated with time, the pre-determined suggested search terms may also be updated with the updating of data, or a new suggested search term may be added.

In some embodiments, the determination for the suggested search terms may be implemented by analyzing the input search term. Association between the input search term and the suggested search terms may be pre-determined, or dynamically determined timely. The determination for the suggested search terms may utilize data analysis technology, such as the NLP technology for performing text semantic understanding, the text feature extraction, the classification technology, and big data analysis technology. In some embodiments, the computing device 130 may analyze the input search term by the NLP technology, to determine the semantic of the input search term. Further, the computing device 130 may determine the suggested search terms based on the semantic of the input search term, such that the semantic of the suggested search terms is associated with the semantic of the input search term. For example, the computing device 130 may determine whether the input search term matches the preset input search term in the search thesaurus based on the semantic. If yes, the computing device 130 may obtain the suggested search terms associated with the matched preset input search term from the search thesaurus, and select parts or all of suggested search terms from the obtained suggested search terms.

In some embodiments, since there are a large number of suggested search terms associated in the search thesaurus, and a display area for the suggested search terms used in the terminal is limited, the computing device 130 may also determine a certain number of suggested search terms which are currently used based on a filtering rule. Such filtering rule may be performed based on popularity of the suggested search terms, user preference and the like.

The popularity of each suggested search term may be determined by measuring a frequency of which the suggested search term is queried, or by measuring the popularity of data (such as websites, blogs, and images) including the suggested search term. For example, the popularity of each suggested search term may be determined by a frequency of the user clicking, selecting or searching within a certain period of time. When the popularity of the suggested search term associated with the input search term is higher, the suggested search term with a higher probability may be selected from the search thesaurus. Since the popularity of the suggested search term may be changed with time, the popularity may be determined in real time.

The user preference refers to preference of the user 110 in the terminal device 120. The preference may be determined by analyzing interaction information associated with the user within a past period of time. The analyzed interaction information may include the input search term, a meaning of the input search term, search results related to the input search term, the suggested search term selected by the user, an interaction mode of the user with the search results, and the like. The interaction mode may include opening a webpage, browsing a certain part of the search results for a long time or slowly, and performing an operation such as liking, sharing, bookmarking, etc. Such interaction information may be obtained by monitoring human-computer interaction on the terminal device 120. The user preference may also be specified by the user 110. In some embodiments, the computing device 130 may select suggested search terms conforming to one or more user preferences from the search thesaurus.

After the one or more suggested search terms are determined, the suggested search terms are displayed for the user to select, such that the user may further refine the search requirement or the direction of interest during searching. Therefore, at block 230, the computing device 130 displays the first group of suggested search terms in the search interface for selecting. The computing device 130 may provide the determined suggested search terms to the terminal device 120, and indicate the terminal device 120 to display the suggested search terms in the current search interface.

Figure 3B:
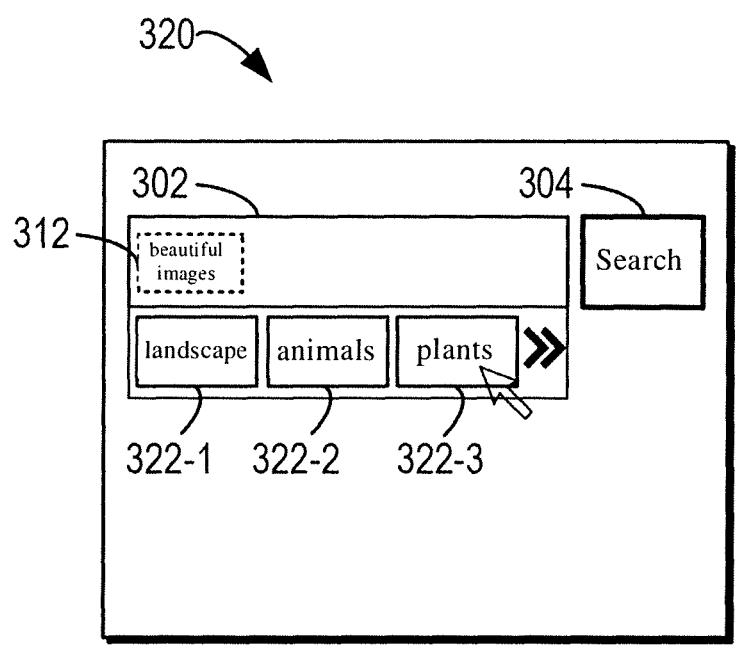

FIG. 3B illustrates an example of a search interface 320 for displaying the suggested search terms. As illustrated in FIG. 3B, a plurality of suggested search terms related to the input search term 312 "beautiful images" may further displayed in the search interface 320, including a plurality of suggested search terms having comparable classifications such as "landscape" 322-1, "animals" 322-2, and "plants" 322-3. For discussing conveniently, all the suggested search terms are called the suggested search term 322. These suggested search terms are used to describe the types of the input search term. Therefore, a current search condition may further be refined.

In some embodiments, when the suggested search terms are displayed, the computing device 130 may also determine an order of the suggested search terms based on an ordering rule, and display a group of suggested search terms based on the determined order. Such ordering rule may also be performed based on the popularity of the suggested search terms, the user preference, etc. For example, the computing device 130 may display a suggested search term with higher popularity in a forward position, and/or display a suggested search term which is more in line with the user preference in a forward position. Suggested search terms that are less popular and/or less consistent with the user preference may be displayed later or hidden. In some embodiments, different ordering rules may have corresponding weights. For example, corresponding weights may be set for the popularity and the user preference. The computing device 130 may comprehensively measure different ordering rules such as the popularity and the user preference based on the weights to determine an ordered position of each suggested search term.

In some embodiments, the group of determined suggested search terms may be displayed in a specific area of the search interface. In some embodiments, the group of determined suggested search terms may be displayed in an area adjacent to the search box for selecting easily. In some embodiments, when there are a large number for suggested search terms, parts of the suggested search terms may be displayed in the search interface and remaining suggested search terms may be hidden. The hidden suggested search terms may be displayed by swiping left and right and/or up and down. For example, in an example of FIG. 3B, the suggested search term 322 may be displayed below the search box, and a rightward arrow indicates that more suggested search terms are hidden. The above is merely a detailed example, and the suggested search terms may be displayed or inputted for the user in any suitable way.

Referring to FIG. 2, at block 240, the computing device 130 determines whether one or more first suggested search terms in the first group of suggested search terms are selected. The computing device 130 may determine a selection for the one or more first suggested search terms by a user input in the terminal device 120. The terminal device 120 may indicate a suggested search term which is selected for the computing device 130. For example, in the search interface 320 in FIG. 3B, one or more suggested search terms 322 may be selected with clicking, touching and the like of a mouse, a finger and other input means. For example, the suggested search term 322-3 "plants" may be selected. In addition, a search request may be initiated by clicking or touching the search button 304.

In some embodiments, when the one or more first suggested search terms are selected, the one or more first suggested search terms and the input search term may be displayed together in the search box. The computing device 130 may indicate or configure the terminal device 120 for displaying. As a search interface 330 illustrated in FIG. 3C, the suggested search term 322-3 "plants" is displayed in the search box 302 after being selected. And, another hidden suggested search term 322-4 "buildings" is displayed. In some embodiments, a copy of the one or more first suggested search terms may also be displayed in the search box, and the one or more first suggested search terms and other suggested search terms may be still displayed for selecting, which is not limited thereto by embodiments of the present disclosure.

Figure 3C:
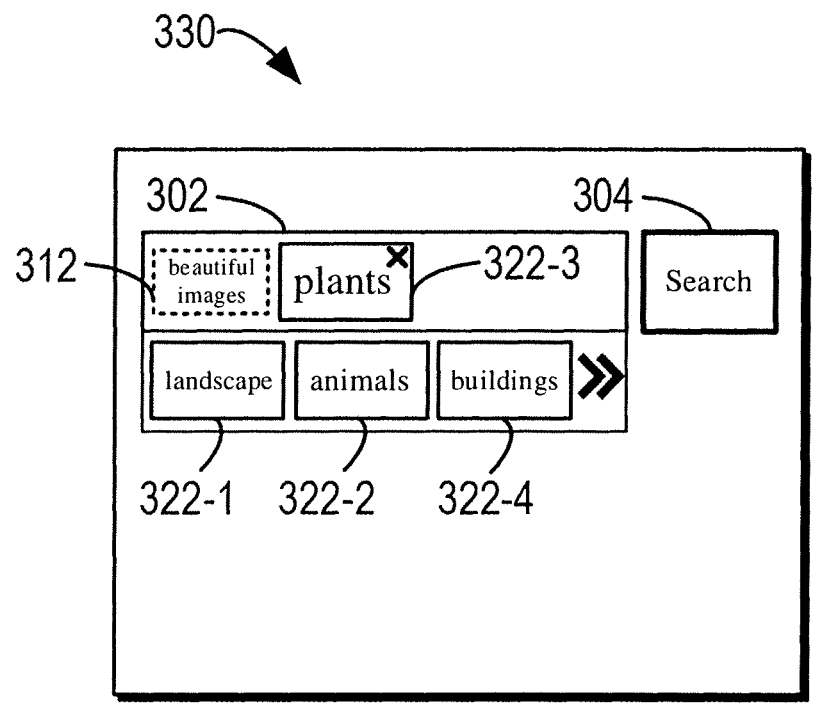
Figure 3D:
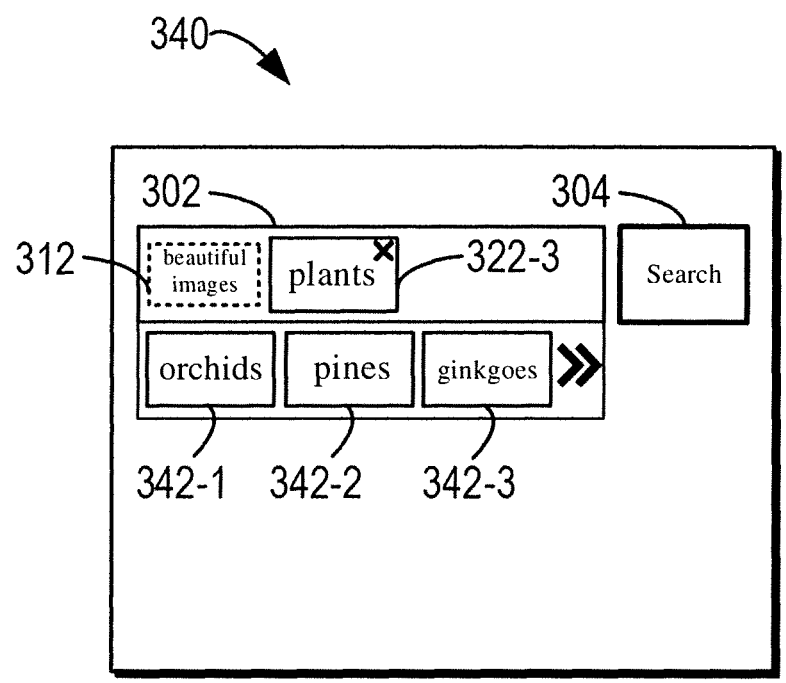
Figure 3E:
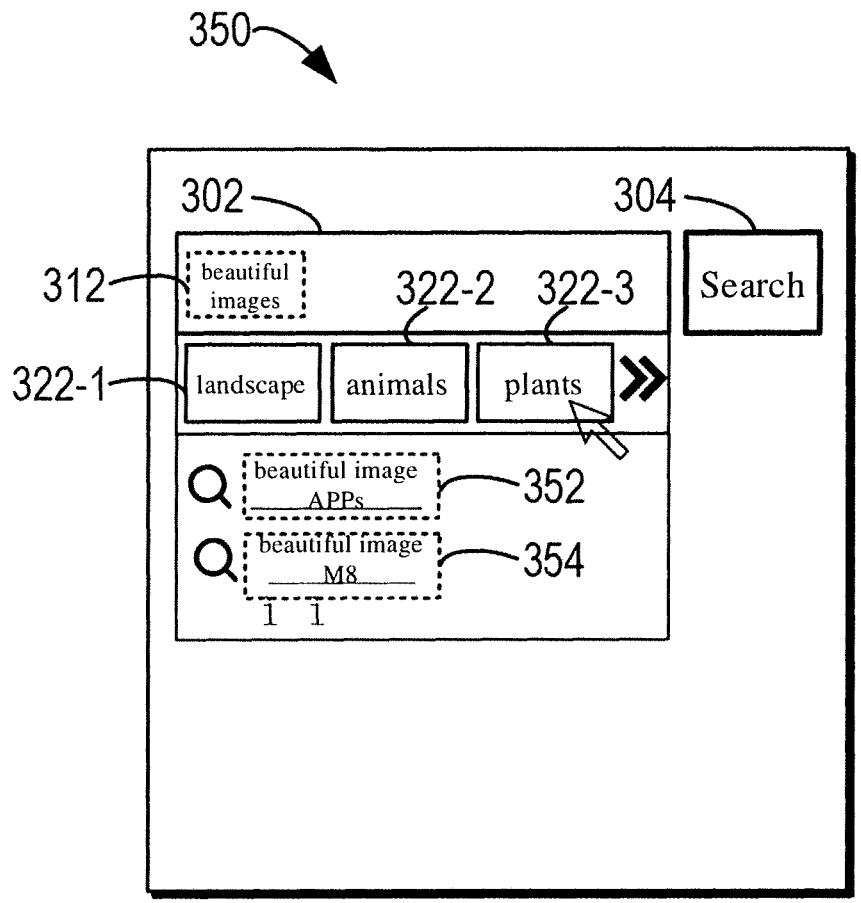

In some embodiments, in order to facilitate the user interaction, a deletion option for the one or more first suggested search terms may be provided, such that the one or more incorrect first suggested search terms may be deleted easily and quickly. For example, as illustrated in FIG. 3C, the suggested search term 322-3 "plants" has a quick delete marker in the upper right corner of the display area, and the suggested search term 322-3 may be deleted by clicking or touching. In some embodiments, when such deletion option is selected, the selection for the one or more first suggested search terms may be canceled. The terminal device 120 may receive the selection for the deletion option, and notify the computing device 130 to cancel the selection. At this time, the one or more first suggested search terms may be not displayed in the search box. In some embodiments, after the selection is canceled, the one or more first suggested search terms may be still displayed in the search interface, such as near the search box for subsequent possible selections.

Referring to FIG. 2, when it is determined that the one or more first suggested search terms are selected, at block 250, the computing device 130 searches, and takes the input search term and the one or more first suggested search terms as the search keywords during searching. Therefore, the search requirement of the user is further refined by selecting the one or more first suggested search terms. Such search refinement may be implemented by taking the search term inputted by the user and the one or more first suggested search terms as the search keywords, thus the search result may be related to the input search term and the one or more first suggested search terms.

In some embodiments, the computing device 130 further determines whether the search requirement is initiated. The search request may be initiated by the user clicking or selecting the search button in the search interface. The terminal device 120 may provide the search request to the computing device 130. In some embodiments, the computing device 130 starts to search when the one or more first suggested search terms are selected and the search request is initiated.

In some embodiments, when no first suggested search term is selected, and the search request is initiated, the computing device 130 may take the input search term as the search keyword for searching. In some embodiments, when the search request is not initiated, editing, updating, adding, deleting and the like for the one or more first suggested search terms and/or the input search term may be waited for continuously.

In some embodiments, more suggested search terms may also be provided for further refining search requirement on the basis of the one or more first suggested search terms being selected. In detail, when the one or more first suggested search terms are selected, the computing device 130 may determine a second group of suggested search terms associated with the input search term and the one or more first suggested search terms. The second group of suggested search terms may be determined based on the input search term and the one or more first suggested search terms as the context. Therefore, more accuracy content classification may be indicated. Determination for the second group of suggested search terms is similar to the determination for the first group of suggested search terms. The difference is that the determination for the second group of suggested search terms is taking the input search term and the one or more first suggested search terms as a condition.

The second group of suggested search terms may be displayed in the search interface. The displaying and selection for the second group of suggested search terms and the interaction way with the user may be similar to the displaying and interaction of the first group of suggested search terms described above, which are not elaborated herein. As a search interface 340 illustrated in FIG. 3D, the second group of suggested search terms may be determined based on the input search term 312 and the suggested search term 322, which may include words "orchids" 342-1, "pines" 342-2, "ginkgoes" 342-3, etc. (for describing conveniently, collectively called as the suggested search term 342). Comparing with the suggested search term 322, the suggested search term 342 may indicate more refinement search direction.

In some embodiments, when one or more second suggested search terms in the second group of suggested search terms are selected, the computing device 130 may search based on the input search term, the one or more first suggested search terms and the one or more second suggested search terms. These search terms may be used as the search keywords during searching, such that search results may be related to these search terms. In some embodiments, the suggested search terms may further be refined based on the one or more first suggested search terms and the one or more second suggested search terms until the user initiates the search request.

In some embodiments, during the selection and refinement for the suggested search terms, when the user edits the input search term, the computing device 130 may determine and display subsequent suggested search terms based on the edited input search term and the selected suggested search term which is effective currently.

In some embodiments, the computing device 130 may utilize various available search keyword-based technologies for searching. These technologies may be currently in use or to be developed in the future, and embodiments of the present disclosure are not limited thereto.

According to embodiments of the present disclosure, providing the suggested search terms, particularly suggested search terms indicating the classification, may enable the user to focus on the suggested search information quickly, and the search term inputted by the user and the selected suggested search term may be analyzed and refined continuously. In some embodiments, the suggested search terms may not depend on or not completely depend on hot data, but may be as classification markers to be recommended for the user. In addition, the displaying, continuously updating and refinement for the suggested search terms may guide the user to further actively express the search requirement and make the user input more directly. The display method may also provide a better requirement expression and recommendation channel for a novice user, such as a user who does not have historical search data. The accuracy for the search result may be improved by refining the search term.

In some embodiments, the suggested search terms according to the present disclosure may also be compatible with suggested search terms or suggested search information determined in other ways. For example, as a search interface 350 illustrated in FIG. 3E, the suggested search information 352 and 354 may be provided based on the popularity of content related to the input search term 312. For example, the suggested search information 353 and 354 has a higher similarity with the input search term 312. The suggested search terms according to the present disclosure, such as the search term 322, may also be compatible with the suggested search information 352 and 354, and be additionally displayed in the search interface for selecting.

Figure 4:
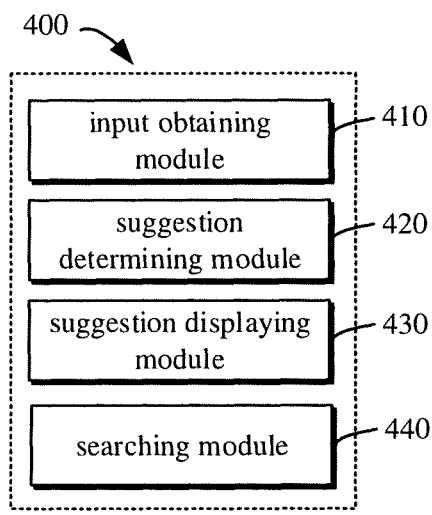
FIG. 4 is a block diagram illustrating an apparatus for providing search suggestions according to some embodiments of the present disclosure.

FIG. 4 is a block diagram illustrating an apparatus 400 for providing search suggestions according to embodiments of the present disclosure. The apparatus 400 may be included in the computing device 130 in FIG. 1 or implemented as the computing device 130.

As illustrated in FIG. 4, the apparatus 400 includes an input obtaining module 410 and a suggestion determining module 420. The input obtaining module 410 is configured to obtain an input search term in a search box of a search interface, and the suggestion determining module 420 is configured to determine a first group of suggested search terms associated with the input search term. The apparatus 400 further includes a suggestion displaying module 430 and a searching module 440. The suggestion displaying module 430 is configured to displaying the first group of suggested search terms in the search interface, and the searching module 440 is configured to, in response to a selection for one or more first suggested search terms from the first group of suggested search terms, search by taking the input search term and the one or more first suggested search terms as search keywords.

In some embodiments, the apparatus 400 further includes a selection displaying module, configured to display the one or more first suggested search terms in the search box in response to the selection for the one or more first suggested search terms.

In some embodiments, the apparatus 400 further includes a deletion option providing module and a selection cancelling module. The deletion option providing module is configured to provide a deletion option for the one or more first suggested search terms. The selection cancelling module is configured to cancel the selection for the one or more first suggested search terms in response to a selection for the deletion option.

In some embodiments, the searching module 440 includes: an additional suggestion determining module, an additional suggestion displaying module and a fining search module. The additional suggestion determining module is configured to determine a second group of suggested search terms associated with the input search term and the one or more first suggested search terms in response to the selection for the one or more first suggested search terms. The additional suggestion displaying module is configured to display the second group of suggested search terms in the search interface. The fining search module is configured to, in response to a selection for one or more second suggested search terms from the second group of suggested search terms, search based on the one or more second suggested search terms.

In some embodiments, the suggestion determining module 420 includes: a determining module based on preset suggestions, configured to select the first group of suggested search terms from a plurality of preset suggested search terms associated with the input search term based on at least one of popularity of suggested search terms and user preference.

In some embodiments, the suggestion determining module 420 includes: a text analysis module and a text analysis-based determining module. The text analysis module is configured to determine semantics of the input search term by performing text analysis on the input search term. The text analysis-based determining module is configured to determine the first group of suggested search terms based on the semantics of the input search term.

In some embodiments, the first group of suggested search terms describe one or more types related to the input search term.

In some embodiments, the first group of suggested search terms are selected from a search thesaurus including the suggested search terms. In some embodiments, the apparatus 400 further includes: a suggestion generating module, configured to generate the suggested search terms included in the search thesaurus by: obtaining first data and second data from at least one data source, the first data and the second data including a preset input search term; and determining suggested search terms associated with the preset input search term based on a correlation between the first data and the second data.

In some embodiments, the suggestion generating module includes: a suggestion generating module based on difference identification, configured to, in response to that the correlation between the first data and the second data is smaller than a threshold, determine the suggested search terms associated with the preset input search term in the first data or the second data, such that a difference between a correlation of the suggested search term and the first data, and a correlation of the suggested search term and the second data is greater than a threshold difference.

In some embodiments, the suggestion generating module is further configured to determine the suggested search terms associated with the preset input search term based on at least one of: reliability of at least one data source and types of data provided by the at least one data source.

In some embodiments, the suggestion displaying module includes: an order determining module and a displaying module based on the order. The order determining module is configured to determine an order of the first group of suggested search terms based on at least one of popularity of suggested search terms and user preference. The displaying module based on the order is configured to display the first group of suggested search terms in the order determined.

Figure 5:
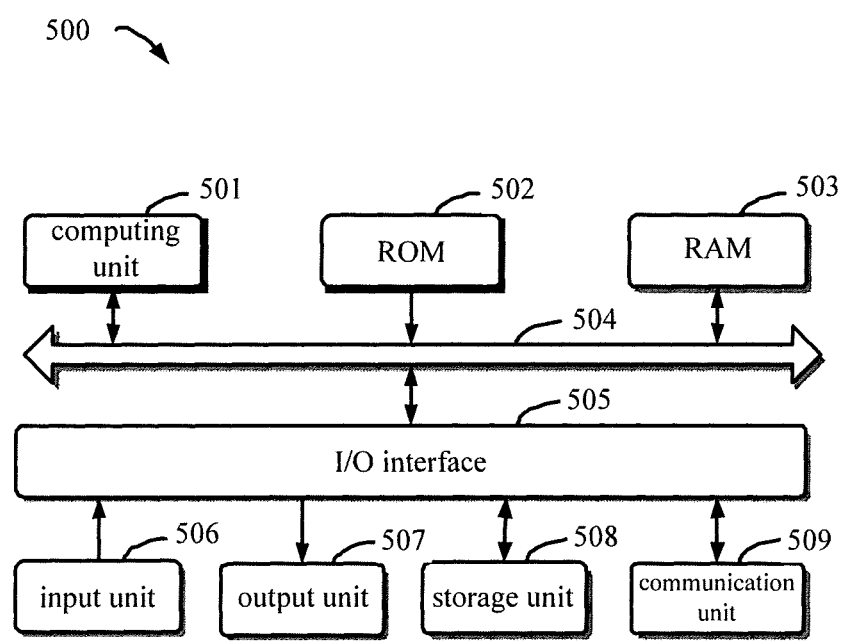
FIG. 5 is a block diagram illustrating a computing device capable of implementing various embodiments of the present disclosure.

FIG. 5 is a block diagram illustrating an exemplary device being capable of implementing a plurality of embodiments of the present disclosure. The device 500 may be configured as the computing device 130 or the terminal device 120 for realizing FIG. 2. As illustrated in FIG. 5, the device 500 includes a computing unit 501. The computing unit 501 may execute various appropriate actions and processes according to computer program instructions stored in a read only memory (ROM) 502 or computer program instructions loaded to a random-access memory (RAM) 503 from a storage unit 508. The RAM 503 may also store various programs and date required by the device 500. The computing device 501, the ROM 502, and the RAM 503 may be connected to each other via a bus 504. An input/output (I/O) interface 505 is also connected to the bus 504.

A plurality of components in the device 500 are connected to the I/O interface 505, including: an input unit 506 such as a keyboard, a mouse; an output unit 507 such as various types of displays, loudspeakers; a storage unit 508 such as a magnetic disk, an optical disk; and a communication unit 509, such as a network card, a modem, a wireless communication transceiver. The communication unit 509 allows the device 500 to exchange information/data with other devices over a computer network such as the Internet and/or various telecommunication networks.

The computing unit 501 may be various general-purpose and/or special-purpose processing components having processing and computing capabilities. Some examples of the computing unit 501 include, but are not limited to, a central processing unit (CPU), a graphics processing unit (GPU), various specialized artificial intelligence (AI) computing chips, various computing units running machine learning model algorithms, and a digital signal processing processor (DSP), and any suitable processor, controller, microcontroller, etc. The computing unit 501 executes the above-mentioned methods and processes, such as the procedure 200. For example, in some implementations, the procedure 200 may be implemented as computer software programs. The computer software programs may be tangibly contained in a machine readable medium, such as the storage unit 508. In some implementations, a part or all of the computer programs may be loaded and/or installed on the device 500 through the ROM 502 and/or the communication unit 509. When the computer programs are loaded to the RAM 503 and are executed by the computing unit 501, one or more actions on the blocks of the procedure 200 described above may be executed. Alternatively, in other implementations, the computing unit 501 may be configured to execute the procedure 200 in other appropriate ways (such as, by means of hardware).

The functions described herein may be executed at least partially by one or more hardware logic components. For example, without not limitation, exemplary types of hardware logic components that may be used include: a field programmable gate array (FPGA), an application specific integrated circuit (ASIC), an application specific standard product (ASSP), a system on chip (SOC), a complex programmable logic device (CPLD) and the like.

Program codes for implementing the method of the present disclosure may be written in any combination of one or more programming languages. These program codes may be provided to a processor or a controller of a general-purpose computer, a special-purpose computer or other programmable data processing device, such that the functions/operations specified in the flowcharts and/or the block diagrams are implemented when these program codes are executed by the processor or the controller. These program codes may be executed entirely on a machine, partly on a machine, partially on the machine as a stand-alone software package and partially on a remote machine, or entirely on a remote machine or entirely on a server.

In the context of the present disclosure, the machine-readable medium may be a tangible medium that may contain or store a program to be used by or in connection with an instruction execution system, apparatus, or device. The machine-readable medium may be a machine-readable signal medium or a machine-readable storage medium. The machine-readable medium may include, but not limit to, an electronic, magnetic, optical, electromagnetic, infrared, or semiconductor system, apparatus, or device, or any suitable combination of the foregoing. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combination of the foregoing.

In addition, although the operations are depicted in a particular order, it should be understood to require that such operations are executed in the particular order illustrated in the drawings or in a sequential order, or that all illustrated operations should be executed to achieve the desired result. Multitasking and parallel processing may be advantageous in certain circumstances. Likewise, although several specific implementation details are included in the above discussion, these should not be construed as limitation of the scope of the present disclosure. Certain features described in the context of separate implementations may also be implemented in combination in a single implementation. On the contrary, various features described in the context of the single implementation may also be implemented in a plurality of implementations, either individually or in any suitable sub-combination.

Although the subject matter has been described in language specific to structural features and/or methodological acts, it should be understood that the subject matter defined in the appended claims is not limited to the specific features or acts described above. Instead, the specific features and acts described above are merely exemplary forms of implementing the claims.

What is claimed is:

1. A method for providing search suggestions, comprising:
    obtaining, by a terminal device, an input search term in a search box of a search interface, wherein the terminal device is installed with an application or software having a search function, obtains the input search term in the search box of the search interface of the application or the software, and sends the input search term to a computing device;
    determining, by the terminal device, a first group of suggested search terms associated with the input search term, wherein the first group of suggested search terms describe one or more types related to the input search term and the first group of suggested search terms comprise a plurality of suggested search terms having classification comparability, and the computing device determines the first group of suggested search terms based on the input search term sent by the terminal device and sends the first group of suggested search terms to the terminal device;
    displaying, by the terminal device, the first group of suggested search terms in the search interface;
    in response to a selection for one or more first suggested search terms from the first group of suggested search terms, searching, by the terminal device, by taking the input search term and the one or more first suggested search terms as search keywords, wherein the terminal device sends the input search term and the one or more first suggested search terms to the computing device for searching;
    determining, by the terminal device, a second group of suggested search terms associated with the input search term and the one or more first suggested search terms in response to the selection for the one or more first suggested search terms, wherein the computing device determines the second group of suggested search terms based on the input search term and the one or more first suggested search terms and sends the second group of suggested search terms to the terminal device;
    displaying, by the terminal device, the second group of suggested search terms in the search interface; and
    in response to a selection for one or more second suggested search terms from the second group of suggested search terms, searching, by the terminal device, based on the one or more second suggested search terms, wherein the terminal device sends the one or more second suggested search terms to the computing device for searching,
    wherein the first group of suggested search terms are selected from a search thesaurus comprises suggested search terms, and the method further comprises:
    generating, by the computing device, the suggested search terms included in the search thesaurus by:
    obtaining first data and second data from at least one data source, the first data and the second data comprising a preset input search term; and
    determining suggested search terms associated with the preset input search term at least based on a correlation between the first data and the second data,
    wherein determining the suggested search terms associated with the preset input search term comprises:
    in response to the correlation between the first data and the second data being smaller than a threshold, determining the suggested search terms associated with the preset input search term in the first data or the second data, such that a difference between a correlation of the suggested search term and the first data, and a correlation of the suggested search term and the second data is greater than a threshold difference.

2. The method of claim 1, further comprising:
    displaying the one or more first suggested search terms in the search box in response to the selection for the one or more first suggested search terms.

3. The method of claim 1, further comprising:
    providing a deletion option for the one or more first suggested search terms; and
    cancelling the selection for the one or more first suggested search terms in response to a selection for the deletion option.

4. The method of claim 1, wherein determining the first group of suggested search terms associated with the input search term comprises:
    selecting the first group of suggested search terms from a plurality of preset suggested search terms associated with the input search term based on at least one of popularity of suggested search terms and user preference.

5. The method of claim 1, wherein determining the first group of suggested search terms associated with the input search term comprises:
    determining semantics of the input search term by performing text analysis on the input search term; and
    determining the first group of suggested search terms based on the semantics of the input search term.

6. The method of claim 1, wherein determining the suggested search terms associated with the preset input search term further comprises:
determining the suggested search terms associated with the preset input search term based on at least one of: reliability of at least one data source and types of data provided by the at least one data source.

7. The method of claim 1, wherein displaying the first group of suggested search terms in the search interface comprises:
determining an order of the first group of suggested search terms based on at least one of popularity of suggested search terms and user preference; and
displaying the first group of suggested search terms in the order determined.

8. An electronic device, comprising:
one or more processors, and
a storage device, configured to store one or more programs, wherein, when the one or more programs are executed by the one or more processors, the one or more processors are configured to implement a method for providing search suggestions, the method comprising:
obtaining an input search term in a search box of a search interface;
determining a first group of suggested search terms associated with the input search term, wherein the first group of suggested search terms describe one or more types related to the input search term and the first group of suggested search terms comprise a plurality of suggested search terms having classification comparability;
displaying the first group of suggested search terms in the search interface;
in response to a selection for one or more first suggested search terms from the first group of suggested search terms, searching by taking the input search term and the one or more first suggested search terms as search keywords;
determining a second group of suggested search terms associated with the input search term and the one or more first suggested search terms in response to the selection for the one or more first suggested search terms;
displaying the second group of suggested search terms in the search interface; and
in response to a selection for one or more second suggested search terms from the second group of suggested search terms, searching based on the one or more second suggested search terms,
wherein the first group of suggested search terms are selected from a search thesaurus comprises suggested search terms, and the method further comprises:
generating, by the computing device, the suggested search terms included in the search thesaurus by:
obtaining first data and second data from at least one data source, the first data and the second data comprising a preset input search term; and
determining suggested search terms associated with the preset input search term at least based on a correlation between the first data and the second data,
wherein determining the suggested search terms associated with the preset input search term comprises:
in response to the correlation between the first data and the second data being smaller than a threshold, determining the suggested search terms associated with the preset input search term in the first data or the second data, such that a difference between a correlation of the suggested search term and the first data, and a correlation of the suggested search term and the second data is greater than a threshold difference.

9. The electronic device of claim 8, wherein the method further comprises:
displaying the one or more first suggested search terms in the search box in response to the selection for the one or more first suggested search terms.

10. The electronic device of claim 8, wherein the method further comprises:
providing a deletion option for the one or more first suggested search terms; and
cancelling the selection for the one or more first suggested search terms in response to a selection for the deletion option.

11. The electronic device of claim 8, wherein determining the first group of suggested search terms associated with the input search term comprises:
selecting the first group of suggested search terms from a plurality of preset suggested search terms associated with the input search term based on at least one of popularity of suggested search terms and user preference;
or
wherein determining the first group of suggested search terms associated with the input search term comprises:
determining semantics of the input search term by performing text analysis on the input search term; and
determining the first group of suggested search terms based on the semantics of the input search term.

12. The electronic device of claim 8, wherein determining the suggested search terms associated with the preset input search term comprises:
determining the suggested search terms associated with the preset input search term based on at least one of: reliability of at least one data source and types of data provided by the at least one data source.

13. The electronic device of claim 8, wherein displaying the first group of suggested search terms in the search interface comprises:
determining an order of the first group of suggested search terms based on at least one of popularity of suggested search terms and user preference; and
displaying the first group of suggested search terms in the order determined.

14. A non-transitory computer-readable storage medium having stored computer programs thereon, wherein, when the computer programs are executed by a processor, a method for providing search suggestions is implemented, the method comprising:
obtaining an input search term in a search box of a search interface;
determining a first group of suggested search terms associated with the input search term, wherein the first group of suggested search terms describe one or more types related to the input search term and the first group of suggested search terms comprise a plurality of suggested search terms having classification comparability;
displaying the first group of suggested search terms in the search interface;
in response to a selection for one or more first suggested search terms from the first group of suggested search terms, searching by taking the input search term and the one or more first suggested search terms as search keywords;

determining a second group of suggested search terms associated with the input search term and the one or more first suggested search terms in response to the selection for the one or more first suggested search terms;

displaying the second group of suggested search terms in the search interface; and in response to a selection for one or more second suggested search terms from the second group of suggested search terms, searching based on the one or more second suggested search terms, wherein the first group of suggested search terms are selected from a search thesaurus comprises suggested search terms, and the method further comprises:

generating, by the computing device, the suggested search terms included in the search thesaurus by:

obtaining first data and second data from at least one data source, the first data and the second data comprising a preset input search term; and determining suggested search terms associated with the preset input search term at least based on a correlation between the first data and the second data, wherein determining the suggested search terms associated with the preset input search term comprises:

in response to the correlation between the first data and the second data being smaller than a threshold, determining the suggested search terms associated with the preset input search term in the first data or the second data, such that a difference between a correlation of the suggested search term and the first data, and a correlation of the suggested search term and the second data is greater than a threshold difference.

\* \* \* \* \*